Jan. 8, 1957    R. L. LARSEN    2,777,105

MOTOR DRIVE CIRCUIT FOR ELECTRICAL MEASURING APPARATUS

Filed Oct. 29, 1953    4 Sheets-Sheet 1

INVENTOR.
ROY L. LARSEN
BY Arthur H. Swanson
ATTORNEY.

Jan. 8, 1957     R. L. LARSEN     2,777,105
MOTOR DRIVE CIRCUIT FOR ELECTRICAL MEASURING APPARATUS
Filed Oct. 29, 1953     4 Sheets-Sheet 2

*INVENTOR.*
ROY L. LARSEN
BY Arthur H. Swanson
ATTORNEY.

Jan. 8, 1957  R. L. LARSEN  2,777,105
MOTOR DRIVE CIRCUIT FOR ELECTRICAL MEASURING APPARATUS
Filed Oct. 29, 1953  4 Sheets-Sheet 4

INVENTOR.
ROY L. LARSEN
BY
ATTORNEY.

United States Patent Office 2,777,105
Patented Jan. 8, 1957

2,777,105

MOTOR DRIVE CIRCUIT FOR ELECTRICAL MEASURING APPARATUS

Roy L. Larsen, Philadelphia, Pa., assignor to Minneapolis-Honeywell Regulator Company, Minneapolis, Minn., a corporation of Delaware Application October 29, 1953, Serial No. 389,051

13 Claims. (Cl. 318—207)

A general object of this invention is to provide a new and improved motor and motor drive circuit. This invention is particularly adapted for use in self-balancing apparatus in which a reversible motor is employed to rebalance a circuit when the latter is unbalanced by a change in a condition. In one form of such apparatus, a measuring circuit unbalance is amplified by means of an electronic amplifier which is operative to impress upon the input of the motor drive circuit, a signal varying in magnitude and phase in accordance with the magnitude and direction of the unbalance. The motor drive circuit, in turn, operates selectively in accordance with the phase and magnitude of said signal to energize the motor for rotation in the direction and to the extent necessary to rebalance the measuring circuit.

Accordingly, a specific object of this invention is to provide a motor and motor drive circuit capable of rebalancing a measuring apparatus of the type described in a minimum of time without the occurrence of overshooting and consequent hunting.

Another object of this invention is to provide an improved motor drive apparatus which is operative to impress upon a two-phase reversible rotating field motor a unidirectional current to damp the motor and prevent it from overshooting the point of balance.

In the prior art motor drive circuits, such as that disclosed in the Wills Patent 2,423,540 of July 8, 1947, unidirectional current is impressed upon a two-phase reversible, rotating field motor to effect desirable motor damping but in such manner that motor chatter tends to be produced. This chatter has been regarded as desirable in that it maintains the motor rotor and associated gearing and movable parts in a nascent or friction-free state. However, it has been found to be objectionable because of its tendency to cause harmful wear on the motor bearings and gears as well as producing needless noise. It is, therefore, a further object of this invention to provide a motor and motor drive circuit which will permit unidirectional current damping without chatter.

Chatter is caused by the interaction of the flux set up by the unidirectional damping current in one motor phase winding interacting with the flux set up by the alternating current induced in the rotor by the alternating current in the other motor phase winding. There are two types of chatter, rotational chatter and side chatter. Rotational chatter is the rapid rotation, through small angular distances, of the rotor first in one direction and then in the other with the changes in direction of the induced rotor current from one cycle to the next. Side chatter is the lateral oscillation of the rotor with changes in the direction of the rotor current.

Another object of this invention is to provide a two-phase, reversible, rotating field motor of the type in which the two motor phase windings are wound on the salient pole pieces of the stator, each pole piece having but one winding or a portion of a winding wound thereon, in which a unidirectional current in the control phase winding will provide motor damping without causing chatter. A motor of this type is of great practical value because the pole pieces can be machine wound prior to assembly providing increased economy of construction, facilitating assembly and increasing the accessibility of parts for purposes of replacement and repair.

Still another object of this invention is to provide a push-pull motor drive circuit directly connected to the control phase winding of a rotating field motor and energized with unidirectional current applied through that winding.

The various features of novelty which characterize this invention are pointed out with particularity in the claims annexed to and forming a part of this specification. However, for a better understanding of this invention, its advantages, and specific objects attained with its use, reference should be had to the accompanying drawings and descriptive matter in which there has been illustrated and described a preferred embodiment of the invention.

Figure 1:
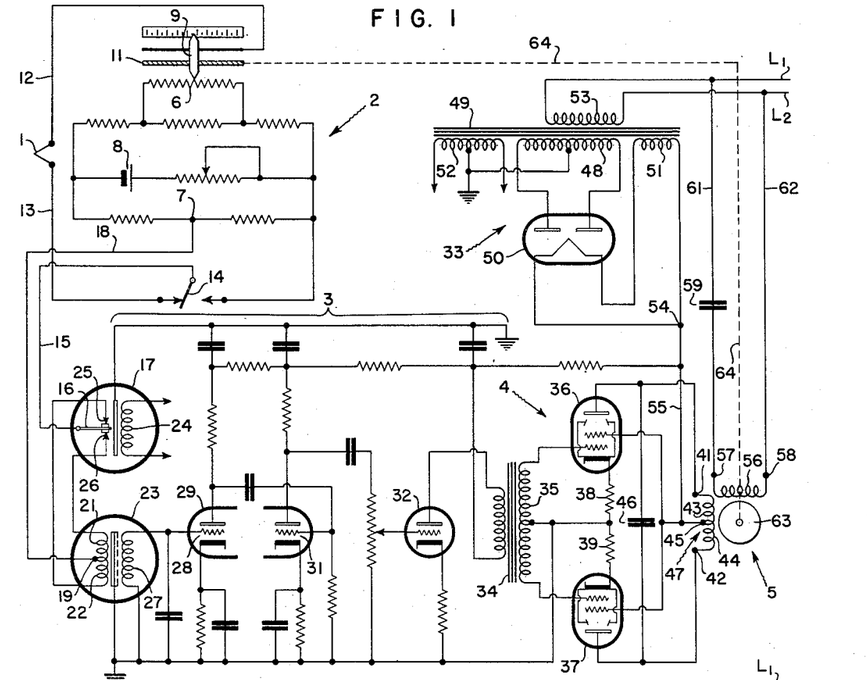
Fig. 1 illustrates this invention adapted for use in a self-balancing measuring apparatus.

Fig. 1 illustrates a practical embodiment of this invention adapted for use in a self-balancing measuring apparatus for measuring the output voltage of a thermocouple 1. In this apparatus, changes in the output voltage of the thermocouple 1 unbalance a potentiometer measuring circuit 2. This unbalance is amplified by means of an electronic amplifier 3 which is operative to impress upon the input of the motor drive circuit 4 a signal, varying in magnitude and phase, in accordance with the magnitude and direction of the unbalance. The motor drive circuit 4 in turn operates selectively in accordance with the phase and magnitude of this signal to energize rebalancing motor 5, driving it in a direction and to the extent necessary to rebalance the measuring circuit 2.

The measuring circuit 2 comprises one branch including slidewire resistor 6, and a second branch including terminal point 7 between a pair of resistors connected in series with one another between the terminals of the circuit branch including slidewire 6. Each of said branches is connected in parallel with each other and in series with a circuit energizing branch including a unidirectional voltage source shown here as a battery 8. A sliding contact 9 engages the slidewire 6 and is adjustable along the length of the latter by the rotation of the adjusting element 11.

The thermocouple 1 is connected through conductor 12 to the slider contact 9, and is connected through the conductor 13, standardizing switch 14, and conductor 15 to the polarized vibrating reed 16 of the converter 17.

The terminal point 7 is connected by the conductor 18 to the common terminal 19 of the primary winding sections 21 and 22 of the input transformer 23. The converter 17 includes a winding 24 energized by alternating current to cause the polarized reed 16 to vibrate with the frequency of the alternating current impressed on the winding 24. As the reed 16 vibrates back and forth under the influence of the winding 24, it alternately engages the contacts 25 and 26. The contact 25 is connected to the end terminal of the winding section 22 of the primary winding of the input transformer 23. The contact 26 is connected to the end terminal of the winding section 21 of the primary winding of the input transformer 23.

The input transformer 23 has a secondary winding 27 which is connected to the input of the triode section 28 of the twin triode vacuum tube 29. The triode section 28 is one of three triode amplifying stages included in the amplifier 3. The input of the triode section 28 is the resistance capacity coupled to the input of the triode section 21 of the twin triode 29, and the output of the latter is resistance capacity coupled to the input of the triode vacuum tube 32. As shown, the triode sections 28 and 31 of the twin triode 29 and the triode 32 are supplied with unidirectional plate current by the power supply 33. The output of the triode 32 is coupled by the transformer 34 to the input of the motor drive current 4 which includes a pair of vacuum tubes 36 and 37 connected in push-pull. The transformer 34 includes a center tapped secondary winding 35, the terminals of which are connected to the respective grids of the motor drive tubes 36 and 37 and the center tap of which is connected through equal biasing resistors 38 and 39 to the cathodes of the motor drive tubes 36 and 37 respectively. As shown, the motor drive tubes 36 and 37 are beam tetrode tubes but it should be understood that they could be any triode or pentode type tube capable of supplying the power required of the motor drive circuit. The plate of the motor drive tube 36 is connected to the end terminal 41 of the winding section 43 of the motor control winding 47 and the plate of the motor drive tube 37 is connected to the end terminal 42 of the winding section 44 of the motor control winding 47. The screen grids of the motor drive tubes 36 and 37 are connected to the center tap 45 of the motor control winding 47, which is the common terminal of the winding sections 43 and 44. The plate circuit of the motor drive tubes 36 and 37 also includes a condenser 46 which is connected across the motor control winding 47.

The motor drive tubes 36 and 37 are energized with unidirectional plate current from the power supply 33. The latter includes the secondary winding 48 of the power transformer 49, the full wave rectifier vacuum tube 50, and the filament winding 51 of the power transformer 49. As shown, the end of the secondary winding 48 and the power transformer 49 are connected to the plates of the rectifier tube 50 and the ends of the filament winding 51 are connected to the cathode of the rectifier tube 50. The transformer 49 also has a center tapped filament winding 52 which energizes the winding 24 of the converter 17 and the filaments of the vacuum tubes 29, 32, 36 and 37 which are not shown. The primary winding 53 of the power transformer 49 is connected to a suitable source of alternating current, conductors L1 and L2. Generally the conductors L1 and L2 represent a source of 110 volts 60 C. P. S. alternating current. The center tap of the power transformer secondary winding 48 is connected to the center tap of the filament winding 52 which is in turned connected to ground. Thus, the terminal 54 of the filament winding 51 is the positive terminal of the power supply 33. The terminal 54 is connected by the conductor 55 to the center tap 45 of the motor control winding 47. Thus, the unidirectional plate current for the motor drive tubes 36 and 37 flows through sections 43 and 44 of the motor control winding 47 and, as will be explained later, provides unidirectional current damping for the rebalancing motor 5.

As shown, the rebalancing motor 5 is a two-phase, reversible, rotating field motor having a rotor 63 and two windings, control winding 47 which is connected to the plate circuits of the motor drive tubes 36 and 37 and a power winding 56. The power winding 56 has terminals 57 and 58. The terminal 57 of the power winding 56 is connected through the condenser 59 by the conductor 61 to an alternating current conductor L1. The terminal 58 of the power winding 56 is connected by conductor 62 and the alternating current conductor L2. The rotor 63 of the rebalancing motor 5 is operative through the gear train 64 to control the adjusting element 11 and thus, the sliding contact 9 of the slidewire resistor 6 in a measuring circuit 2.

When the measuring apparatus is unbalanced by a change in the output voltage of the thermocouple 1, current is caused to flow in the circuit comprising the thermocouple 1, the conductors 13 and 15, vibrating reed 16, contacts 25 and 26, the input transformer winding sections 21 and 22, the conductor 18, and the bridge circuit connected between the slider contact 9 and the terminal point 7. When such unbalance occurs, the rebalancing motor 5 is energized for rotational operation and adjusts the slider contact 9 in a direction and to the extent necessary to restore the equality between the voltages of the thermocouple and the potential drop of the bridge circuit between the point 7 and the slidewire point engaged by the slider 9. When the apparatus is unbalanced the direction of the flow of current through the thermocouple is in one direction or the other as the thermocouple voltage exceeds or is less than the voltage drop in the bridge circuit between the point 7 and the slider contact 9.

When the current flows through the thermocouple circuit the operation of the converter 17 causes current pulses to flow alternately through the transformer primary winding sections 21 and 22. When voltage unbalance is in one direction, the current pulses pass through each of the winding sections 21 and 22 toward the common terminal 19 and the conductor 18. When the unbalance is in the opposite direction, the current flow through each of the winding sections 21 and 22 is in a direction away from the common terminal 19, and alternating current is induced in the transformer secondary winding 27 which is in phase or 180° out of phase with the current flowing in the energizing coil 24 of the converter 17, depending on the construction of the apparatus. The phase of the current induced in the winding 27 is reversed, or shifted 180°, by reversal of the direction of the current flow to the transformer winding sections 21 and 22.

The voltage of one phase or the opposite phase induced in the transformer secondary winding 27 is amplified by the triode sections 28 and 31 of the twin triode vacuum tube 29 and the triode vacuum tube 32. The output of the triode 32 is applied to the primary of the transformer 34. The transformer 34 is both a voltage amplifier and a phase inverter. Since the secondary winding 35 of the transformer 34 constitutes one continuous winding, tapped at the center for grid bias return, input signals proportional in magnitude and phase to the magnitude and direction of the measuring circuit unbalance but 180° out of phase with each other are applied to the control grids of the motor drive tubes 36 and 37. Thus, during the first half cycle of the alternating line voltage one of these grids is driven more positive than any other and during the second half cycle the reverse condition is true. With a relatively large signal, one motor drive tube is alternately conductive and nonconductive, one conducting while the other is cut off. This results in an alternating current flow through sections 43 and 44 of the motor control winding 47. The condenser 46 connected across the motor control winding 47 is so selected with respect to that winding, that at the frequency of the line voltage, they will form a parallel resonant circuit. This parallel resonant circuit presents a relatively high external impedance and a relatively low internal circuit impedance. With the relatively high external impedance of the parallel resonant circuit approximates the impedance of the plate circuits of the vacuum tubes 36 and 37 whereby optimum conditions of power transfer are approached. The relatively low internal circuit impedance approximates the actual resistance of the sections 43 and 44 of the control winding 47, and since this resistance is relatively low, the impedance of the internal circuit is relatively low. In addition, the current in the control winding 47 is approximately 90° out of phase with the supply voltage and leads or lags that voltage depending on the direction of the measuring circuit unbalance.

As described earlier, the motor 5 includes a power winding 56 connected in series with the condenser 59 across a suitable source of alternating current, conductors $L_1$ and $L_2$. The condenser 59 is so selected with respect to the power winding 59 as to form therewith a substantially series resonant circuit at the frequency of the alternating current in the conductors $L_1$ and $L_2$. As a result, the current in the power winding 56 is substantially in phase with the voltage across the conductors $L_1$ and $L_2$. In addition, the total impedance of the power winding is approximately equal to the resistance of the power winding which is relatively low. This results in a relatively large current flow therein which produces a high motor torque.

As will be explained in greater detail later, the windings 56 and 47 are so wound and positioned on the stator of the motor 5 with respect to the rotor 63 that when energized with currents of suitable magnitude and of phases which differ by 90 electrical degrees, a resulting rotating magnetic field will be produced in the rotor 63 causing it to rotate in one direction or the other depending upon the phase relationship between said currents. Thus, the alternating voltage representative of the measuring circuit unbalance is applied to the grids of the motor drive tubes 36 and 37 causing an alternating current to flow in the control winding 38. This alternating current sets up a magnetic field which interacts with the magnetic field set up by the current flowing in the power winding 56 causing the rotor 63 to rotate in a direction and to the extent necessary to rebalance the measuring circuit 2.

Since the motor drive tubes 36 and 37 each contribute equally to the alternating current produced in the motor control winding 47 and the phase of that current depends only on the sequence of their conduction, if one tube should fail the remaining tube would be operative to drive the motor 5 to balance. This feature of a push-pull motor drive circuit provides a substantial factor of safety upon the failure of either of the motor drive tubes.

In order that the speed of the motor 5 may be as great as possible during the rebalancing without overshooting the balanced point of the measuring circuit 2, the motor drive circuit 4 is operative to provide unidirectional current damping for the rotor 63. The energizing voltage for the motor drive tubes 36 and 37 is obtained from the power supply 33 and is applied to the center tap 45 of the motor control winding 47. Thus, the energizing current for these tubes flows through both sections of the motor control winding. The power supply 33 as shown in Fig. 1 employs a full wave rectifier tube 50 which produces a unidirectional voltage having a D. C. component and an alternating current component having a fundamental frequency of 120 cycles. The condenser 46 connected in parallel with the motor control winding operates to maintain the D. C. component of the current flow therethrough at a substantially steady value and also provides a low impedance path for the 120 cycle current flow in the motor control winding. Since, the motor control winding has a low resistance, the D. C. current component of the current flowing therethrough is relatively great while the amplitude of the alternating current component of the current flowing therethrough is relatively small because of the high inductance of the winding. The D. C. component flow through the motor control winding when the potentiometer system is balanced acts as a brake to prevent the rotation of the rotor 63. Rotation of the rotor causes the conductor bars thereof to cut flux produced by the D. C. current flowing through the sections 43 and 44 of the motor control winding 47 and thus produces a relatively high current in the rotor bars which in turn quickly expands the force of rotation of the rotor. In other words, the developing of a relatively high current in the rotor bars by the rotation of the rotor acts to prevent rotation of the rotor, thereby providing an effective braking action. The amount of this braking action is determined by the amount of direct current flowing through the motor control winding. The braking action may be increased or decreased by varying the amount of direct current flow.

Figure 2:
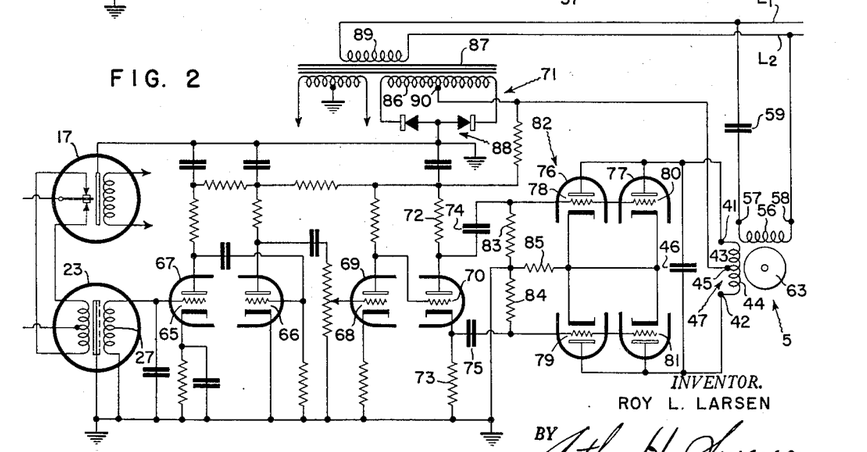
Fig. 2 is another embodiment of the amplifier which is a part of this type of self-balancing measuring apparatus.

In Fig. 2 there is shown another embodiment of the amplifier and push-pull motor drive circuit shown in Fig. 1. This amplifier employs a converter 17 and an input transformer 27 which are mechanically and electrically similar to the converter and input transformer employed in the apparatus shown in Fig. 1. The primary winding 27 of the input transformer 23 is connected to the input of the triode section 65. The triode section 65 is one of three triode sections employed in the voltage amplifying stage in this electronic amplifier. The triode sections employed include triode sections 65 and 66 of the twin triode vacuum tube 67 and the triode section 68 of the twin triode vacuum tube 69. These triode sections are resistance capacity coupled to each other and are supplied with unidirectional plate current by the power supply 71. The triode section 70 of the twin triode vacuum tube 69 is employed as a phase inverter. The grid of the triode section 70 is directly coupled to the plate circuit of the triode section 68. This eliminates the customary coupling condenser and grid resistor as well as providing better quiescent operating voltages at the plate and cathode of the phase inverter. The plate of the triode section 70 is energized with unidirectional current from the power supply 71 through the resistor 72. The cathode of the triode section 70 is connected to ground through the resistor 73 which is equal in value to the resistor 72. Thus, the voltage drops across the resistors 72 and 73 are substantially equal in magnitude but 180° out of phase. The plate and cathode of the phase inverter section 70 are coupled by the condensers 74 and 75 to the input of the motor drive circuit 82.

The motor drive circuit 82 employs the twin triode vacuum tubes 76 and 77, having the triode sections 78 and 79, and 80 and 81 respectively. The elements of the triode section 80 are connected in parallel with the elements of the triode section 78, and the elements of the triode section 81 are connected in parallel with the elements of the triode section 79. The parallel connected triode sections 78 and 80 are connected in push-pull relationship to the parallel connected triode sections 79 and 81. With the triode sections of the vacuum tubes 76 and 77 interconnected in this manner, if one tube or a section of one tube should fail, the other tube or the parallel connected section of the other tube should sustain the operation of the motor drive circuit.

The grids of the triode sections 78 and 80 are connected to a plate of the phase inversion triode section 70 to the coupling condenser 74 and then through the resistor 83 to ground. The grids of the phase inverter triode sections 79 and 81 are connected to the cathode of the phase inversion triode section 70 through the coupling condenser 75 and to ground through the resistor 84. The cathodes of the sections 78, 79, 80, and 81 are all connected through the resistor 85 to ground. The plates of the triode sections 78 and 80 are connected to the end terminal 41 of the winding section 43 of the motor control winding 47. The plates of the triode sections 79 and 81 are connected to the end terminal 42 of the winding section 43 of the motor control winding 47. Thus, in this apparatus as in the one shown in Fig. 1, the motor control winding 47 of the two-phase reversible rebalancing motor 5 is directly coupled to the push-pull motor drive circuit. The plate circuits of the vacuum tubes 76 and 77 also include condenser 46 which is connected across the motor control winding 47.

The motor drive circuit 82 is energized by unidirectional current of the power supply generally designated by the number 71 which includes the secondary winding 86 of the transformer 87 and the full wave dry rectifier 88. The transformer 87 has its primary winding 89 connected to a suitable source of alternating current, conductors L₁ and L₂. The positive terminal 90 of the power supply 71 is the tap of the transformer winding 86 and is connected to the center tap 45 of the motor control winding 46. Thus, the unidirectional plate current for the vacuum tubes 76 and 77 is applied thereto through both sections of the motor control winding 47.

This amplifier and motor drive circuit can be employed in the self-balancing measuring apparatus shown in Fig. 1 in the same manner as the amplifier and motor drive circuit there shown. The two apparatuses function in the same manner and both are operative to supply a unidirectional damping current to the motor control winding 47. As shown, the rebalancing motor 5 will again have its power winding 56 connected across the conductors L₁ and L₂ through the condenser 59.

In prior art devices the direct current flux which affects motor damping also, in the absence of an over-powering rotating flux, interacts with the flux set up by the current induced in the rotor bars by the alternating current flowing in the motor power windings causing chatter. There are two forms of motor chatter, rotational chatter and side chatter and, depending upon the motor and motor drive circuit employed, the motor can have either one or both types of chatter. Rotational chatter is the rotation of the rotor first in one direction and then in the other as the direction of the alternating current in the rotor bars is changed from one half cycle to the next. Side chatter is the lateral oscillation of the rotor with changes in the direction of the rotor current. Both types of chatter may cause harmful and needless motor bearing and gear wear and produce objectionable noise.

To illustrate graphically the cause of chatter there is shown diagrammatically in Figs. 3, 4, 5, and 6 a two-phase, two rotating-pole, motor having a rotor 131 and a stator 132. The rotor is a squirrel cage rotor with interconnected rotor bars. Only two of these bars 133 and 134 are shown. The stator 132 has a yoke 135 and four salient pole pieces numbered 136 to 139, extending inward from the yoke toward the rotor. This rotor has two separate phase windings which are wound on the pole pieces of the stator. For simplicity, these windings are not shown, however, the directions of the flux fields set up in the motor by the currents in these windings are indicated by arrows pointing from the north pole of each flux field. For the purpose of this explanation, the diametrically opposite pole pieces 139 and 137 are wound with a winding energized with alternating current and the other two pole pieces 136 and 138 are wound with a winding energized with a unidirectional current.

Figure 3:
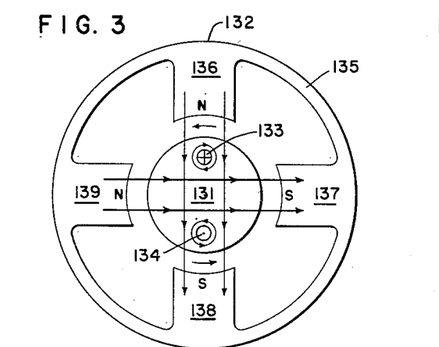
Fig. 3 and Fig. 4, illustrate the cause of rotational chatter in a two-phase, rotating field motor.
Figure 4:
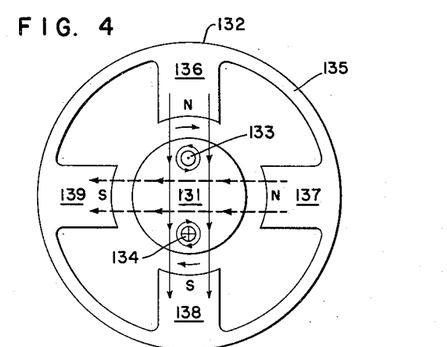

With reference to Figs. 3 and 4, the windings on the pole pieces 136 and 138 are wound in such a way that unidirectional current flowing therein establishes the rotor end of the pole piece 136 as a north pole and the rotor end of the pole piece 138 as a south pole. The direction of the alternating flux produced by the current flowing in the windings of the pole pieces 139 and 137, is during one half cycle as shown by the solid horizontal arrows in Fig. 3, and during the next half cycle, as shown by the dotted horizontal arrows in Fig. 4. The energization here described is that which occurs when there is no rebalancing signal impressed to the motor. The above described alternating flux induces alternating current in the rotor bars. The directions of these alternating currents are indicated with a dot for a direction out from the paper and a cross for a direction into the paper. These rotor currents in turn create flux fields which have the directions indicated by the curved arrows concentric to the rotor bars. These flux fields interact with the flux set up in the motor by the unidirectional current flowing in the windings on the pole pieces 136 and 138 which are shown by the light vertical arrows. The interaction of these two flux fields impart to the rotor torques having directions shown by the curved arrows in the air gaps. Thus, during one half cycle of the alternating current in the rotor bars, as shown in Fig. 3, these torques turn the rotor in one direction and during the next half cycle, as shown in Fig. 4, the torques then existing turn the rotor in the opposite direction. Thus, this motor will exhibit rotational chatter when the balanced condition exists.

Figure 5:
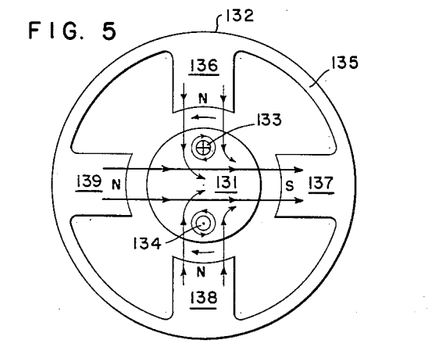
Fig. 5 and Fig. 6, illustrate the cause of side chatter in a two-phase, rotating field motor.
Figure 6:
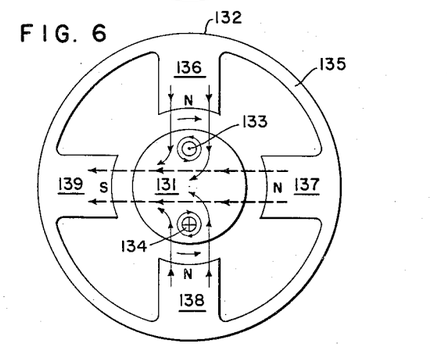

Instead of connecting the windings on the pole pieces 136 and 138 to produce the polarities shown in Figs. 3 and 4, these windings may be connected to produce the polarities shown in Figs. 5 and 6. In these figures the unidirectional current flowing in the windings on the pole pieces 136 and 138 establish the rotor ends of both pole pieces as north poles. The alternating flux produced by the alternating current in the windings on the pole pieces 139 and 137 have, during respective half cycles, the direction indicated by the horizontal arrows in the Figs. 5 and 6 and induce currents in the rotor bars having the directions shown. These currents in turn produce the flux fields indicated by the arrows concentric to the rotor bars. The flux fields created by the currents flowing the rotor bars interact with the flux fields established in the motor by the unidirectional current flowing in the windings in the pole pieces 136 and 138 and indicated by the light vertical arrows. This interaction imparts to the rotor torques having the directions indicated by the arrows in the air gaps. In this motor, the net rotational torque is zero but the torques combine to impress upon the rotor a side thrust. During one half cycle of the currents in the rotor bars, this thrust moves the rotor in one direction and during the next half cycle the thrust then existing moves the rotor in the opposite direction. That is, the rotor is urged to the left during one half cycle, as shown in Fig. 5, and to the right during the next half cycle, as shown in Fig. 6. Thus, this motor, when wound and energized as shown in these figures, has side chatter but no rotational chatter. It should be noted that no four pole piece motor of this type can be free of both types of chatter when one winding is energized with a unidirectional current.

For the purpose of the explanation just made, the reactance of the rotor and the effect of any pulsations in unidirectional current in the motor control winding have been ignored, however, when rotor current and unidirectional flux exist simultaneously the conditions will exist and cause the motor to chatter in the manner described according to its method of connection.

It is obvious that chatter caused by direct current in the control winding can be reduced or eliminated by reducing the amounts of or eliminating the direct current in that winding. To do this, however, would reduce or eliminate the beneficial braking action provided by the direct current. Thus, to eliminate chatter and still retain the D. C. damping afforded by use of a direct coupled, push-pull motor drive circuit energized with unidirectional current, a new way of arranging the motor winding with respect to the motor drive circuit energizing current is employed.

Figs. 3 and 4 show an arrangement such as would exist in the case where the unidirectional current was that current passed by a single vacuum tube. Then, imposing an A. C. signal of suitable frequency and phase upon the grid of such a tube would cause that unidirectional current to be stronger during one half cycle than the next. This would cause a greater rotational torque in one direction than in the other, thereby producing rotation of the rotor. When there is no drive signal imposed upon the motor, a tendency for rotation to be produced in one direction during one half cycle will be equal and opposite to the tendency to produce rotation during the next half cycle. This results in rotational chatter of the rotor that tends to impose severe wear on the teeth of the gears attached thereto. This objectionable characteristic is one that the present invention is designed to overcome.

The push-pull circuit does not lend itself to being connected to motors so as to produce the flux conditions shown in Figs. 3 and 4. When an alternating current signal is impressed upon the grids of the push-pull connected output tubes 36 and 37 of Fig. 1, at a given instance, the current in the winding section 43 of the motor control winding 47 will be increased and the current in the winding section 44 will be decreased. During the following half cycle, the current in the winding section 44 will be increased and the current in the winding section 43 will be decreased. If the motor shown in Figs. 5 and 6 were so connected, these increases and decreases of current flowing in the motor control winding 47 produce the effect of the superimposed alternating field upon the unidirectional field set up in the motor by the unidirectional currents flowing in that winding. This alternating field in combination with the alternating fields set up by the alternating current in the windings on the pole pieces 139 and 137 would produce the required rotating field for driving rotationally a two-phase motor in a direction dependent upon the phase relationship between the two flux fields.

Figure 7:
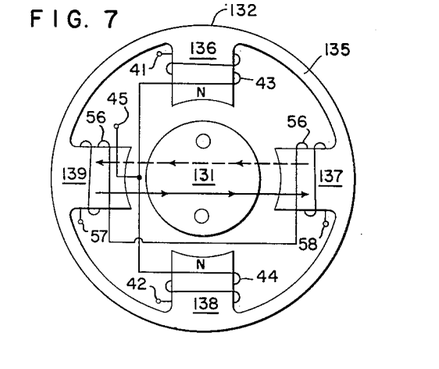
Fig. 7 illustrates the effect of center tapping the motor shown in Figs. 3, 4, 5, and 6 and driving it from a push-pull connected motor drive circuit.

Fig. 7 shows the motor illustrated in Figs. 5 and 6 with windings properly connected for push-pull drive. The motor control winding 47 has section 43 wound on the pole piece 136 and section 44 wound on the pole piece 138. The power winding 56 is wound on the pole pieces 139 and 137. Unidirectional current flowing from the center tap 45 in opposite directions to both sections of the motor control winding 47 establishes the rotor ends of the pole pieces 136 and 138 as north poles. Thus, with respect to the unidirectional current flowing in the winding sections 43 and 44 on the pole pieces 136 and 138, this motor is similar to one shown in the Figs. 5 and 6. So it follows, that a four pole piece motor having windings as shown in Fig. 7 and connected to a push-pull amplifier, will be subject to side chatter but will be free from rotational chatter. It is true that all motors of this type having an even number of pole pieces and adapted to be connected to a push-pull motor drive circuit will be free of rotational chatter and its harmful effects.

Figure 8:
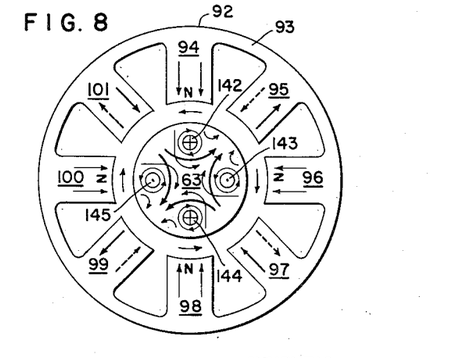
Fig. 8 illustrates one way of eliminating chatter from this type of motor when the number of pole pieces on the stator is increased from four to eight.

It is possible by increasing the number of pole pieces on the stator of this type of motor and by judiciously arranging the motor windings thereon with respect to the rotor, to eliminate both rotational and side chatter. This is another object of the present invention. Referring to Fig. 8, there is shown diagrammatically a two-phase, reversible, rotating-pole motor having eight salient pole pieces on the stator. This motor has a squirrel cage rotor 63 having interconnected rotor bars. Four of these rotor bars, 142, 143, 144, and 145 are shown. The stator designated as 92 has a yoke 93 and eight salient pole pieces numbered 94 to 101. The motor has two windings, a power winding and a control winding, which for clarity have not been shown. However, the direction of the flux fields set up in this motor by the currents flowing in these windings are indicated by arrows pointing from the north pole of each flux field. The power winding is wound on the pole pieces 95, 97, 99, and 101. The direction of the flux field set up in these pole pieces by alternating current flowing in the power winding is during one half cycle as indicated by the solid arrows and during the next half cycle as indicated by the dotted arrows. The control winding of this motor is wound on the pole pieces 94, 96, 98, and 100. This winding is so wound that when the motor is connected to the motor drive circuit 4 shown in Fig. 1, the unidirectional current flowing from the center tap of the motor control winding through both sections of that winding establishes the rotor end of all of these pole pieces as north poles.

During one half cycle of the alternating current supplied to the power winding, the flux field set up by that current, as indicated by the heavy solid arrows, induces alternating currents in the rotor bars having directions as shown. These rotor bar currents in turn set up flux fields, which are indicated by the arrows concentric to the rotor bars, which interact with the flux fields set up in the motor by the unidirectional current flowing in the control winding. The interaction of these two flux fields impart torques to the rotor as shown by the arrows in the air gaps. It will be noted, that the net rotational torque imparted to the rotor is zero and that the net side thrust imparted to the rotor by these torques is also zero. During the next half cycle of the alternating current in the power windings the flux conditions described are reversed, which reverses the direction of the torques imparted to the rotor. Since all of the torques are reversed, their net effect is still zero and in the absence of an unbalance signal in a control winding of this motor there will be no rotor motion and therefore no side or rotational chatter. Thus, by increasing the number of stator pole pieces and by carefully arranging the motor windings it is possible to eliminate the side chatter from a center tapped, push-pull driven, two-phase rotating field motor.

Figure 9:
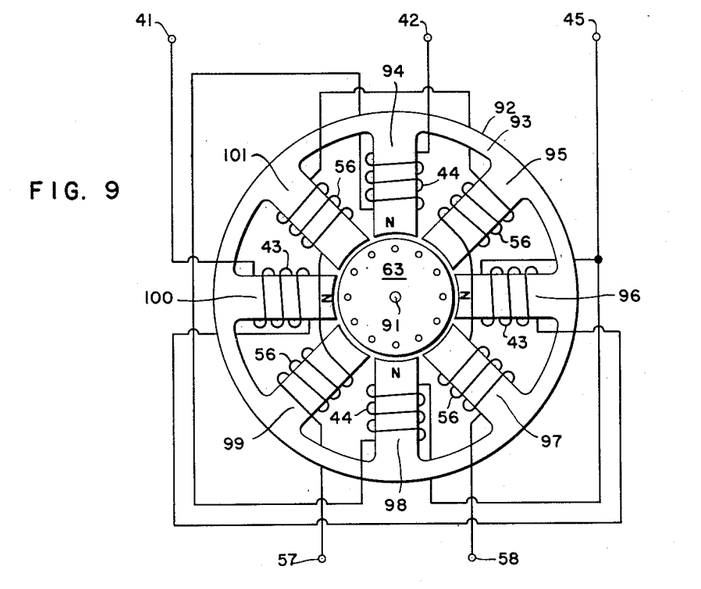
Fig. 9 illustrates the preferred winding arrangement of the motor shown in Fig. 8; and employed in the apparatus shown in Fig. 1.

Fig. 9 shows the method of winding the motor shown in Fig. 8 to eliminate side chatter. This motor is the preferred embodiment of the motor to be used with the motor drive circuit and self-balancing measuring apparatus shown in Fig. 1. As illustrated in Fig. 8, the motor has the rotor 63 mounted on a shaft 91 pivoted for rotation about its axis with respect to the stator 92. The rotor 63 is a squirrel cage rotor having an interconnected rotor bar. The stator 92 has a yoke 93 and eight salient pole pieces numbered 94 through 101 extending inward from the yoke toward the rotor. The two motor windings, the power winding 56, and the control winding 47 are wound on these pole pieces. The power winding 56 is shown having two terminals 57 and 58. The control windings have two sections 43 and 44 having end terminals 41 and 42 respectively and a common terminal or winding center tap 45. Each of the pole pieces has but one portion of a winding or winding section wound thereon.

The power winding 56 is wound on the pole pieces 95, 97, 99, and 101. The control winding 47 has section 43 wound on the pole pieces 100 and 96 and has section 44 wound on the pole pieces 94 and 98. These windings are so wound on their respective pole pieces as to establish the flux conditions indicated in Fig. 8. As just explained direct current flowing from the center tap 45 through both sections of the control winding 47 will establish the rotor ends of the pole pieces 94, 96, 98, and 100 as north poles. Thus, when this motor is driven from the motor drive circuit shown in Fig. 1 or any other push-pull connected motor drive circuit, it will be free of chatter.

Figure 10:
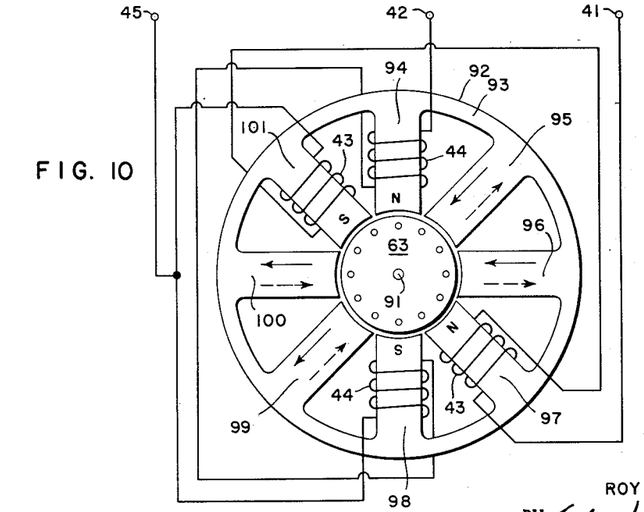
Fig. 10 shows the principles of the motor shown in Fig. 8 applied to a two-phase, two rotating-pole motor.

The winding configuration shown in Figs. 8 and 9 is not the only one which will eliminate the side chatter from an even number pole piece motor of this type. Fig. 10 shows a modification of the motor shown in Figs. 8 and 9 in which the principles of the present invention are again applied to an eight pole piece motor. Unlike that motor which was a four rotating-pole motor, this motor is a two rotating-pole motor. As before, the motor has a squirrel cage rotor 63 mounted for rotation with respect to a stator 92. The stator 92 has a yoke 93 and eight salient pole pieces numbered 94 to 101 which extend inward toward the rotor from the yoke. The motor has two windings, a power winding 56 and a control winding 47 wound on these pole pieces. For clarity, the power winding 56 which is wound on the pole pieces 95, 97, 99, and 100 is not shown. However, the direction of the flux set up in those pole pieces by the alternating current in this winding is indicated by arrows. The solid arrows indicate the direction of the flux during one half cycle of the alternating current applied thereto and the dotted arrow indicates the direction of the flux during the next half cycle. The control winding 47 has two sections 43 and 44 with end terminals 41 and 42 respectively and common or winding center tap terminal 45. Section 43 of the control winding 47 is wound on the pole piece 101 and the diametrically opposite pole piece 97. Section 44 of the control winding 47 is wound on the pole piece 94 and the diametrically opposite pole piece 98. The control winding sections 43 and 44 are so wound on their respective pole pieces that when this motor is connected to the motor drive circuit 4 shown in Fig. 1, the unidirectional current flowing through section 43 of the control winding sets up a flux in the pole piece 101 having a south pole at the rotor end of that pole piece and a flux in the pole piece 97 having a north pole at the rotor end of that pole piece. The unidirectional current flowing through the section 44 of the control winding 47 sets up a flux in the pole piece 94 having a north pole at the rotor end of that pole piece and a flux in the pole piece 98 having a south pole at the rotor end of that pole piece. With the control winding 47 wound in this manner, the unidirectional current flowing therethrough sets up a flux which interacts with the current induced in the rotor bars by the alternating current in the power winding 56 in such a manner that equal and opposite rotational torques and equal and opposite side thrusts are impressed on the rotor 63. Since there is no net rotational torque or net side thrust, this motor will not chatter.

Figure 11:
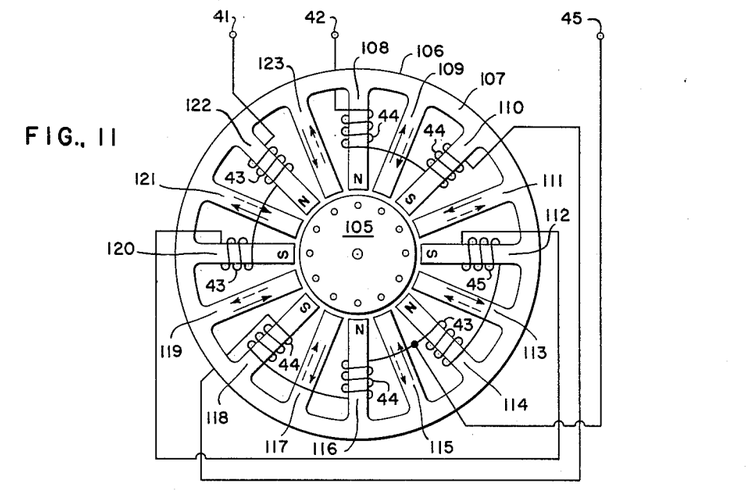
Fig. 11 shows the principles of the motor shown in Fig. 8 applied to a two-phase, eight rotating-pole motor.

Fig. 11 illustrates another modification of the rebalancing motor of Fig. 1. In this figure, the invention is shown adapted to a 16 pole piece, 8 rotating pole motors having a squirrel cage rotor 105 and a stator 106. The stator 106 has a yoke 107 and sixteen salient pole pieces numbered 108 through 123 extending inward from the yoke toward the rotor. The motor has two windings, a power winding and a center tapped control winding 47 having two sections 43 and 44. Again, for simplicity, the power winding of this motor is not shown, but it is wound on the pole pieces 109, 111, 113, 115, 117, 119, 121, and 123 in such a manner as to set up flux fields in those pole pieces having directions as indicated by the arrows. The solid arrows indicate the direction of the flux fields during one half cycle of the alternating current applied thereto and the dotted arrow indicates the direction of the flux fields during the next half cycle of the alternating current. The center tap control winding 47 has section 43 wound on the pole pieces 122, 120, 112, and 114 and the section 44 wound on the pole pieces 108, 110, 118, and 116. The control winding sections 43 and 44 are so wound on their respective pole pieces that when this motor is connected to the motor drive circuit 4 shown in Fig. 1 the unidirectional current flowing therein will establish flux fields in the pole pieces having the following polarities with respect to the rotor at the rotor end of those pole pieces: 108 a north pole, 110 a south pole, 112 a south pole, 114 a north pole, 116 a north pole, 118 a south pole, 120 a south pole, and 122 a north pole. In this motor, as in the motor shown in Fig. 10, the control winding 47 is so wound on its pole pieces that the direct current flowing therein establishes the same number and type of poles with respect to the rotor on either side of any motor diameter. In other words, the poles established by the direct current are symmetrically arranged with respect to the rotor. Due to this symmetry, the motor will not have side chatter. This is true of any motor of this type in which the direct current poles are symmetrically arranged with respect to the rotor regardless of the number of pole pieces and it may be considered as a criterion for eliminating side chatter.

Figure 12:
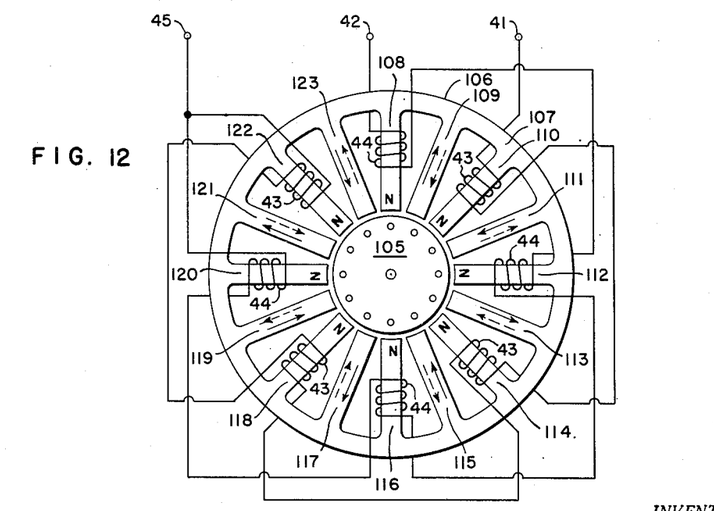
Fig. 12 shows a modification of the winding arrangement of the motor shown in Fig. 11.

Fig. 12 shows another way of winding the 16 pole piece rotating pole motor to insure quiet motor operation. Like the motor shown in Fig. 11, this motor has a squirrel cage rotor 105 and a stator 106 having a yoke 107 and sixteen pole pieces, numbered 108 through 123, extending inward from the yoke to the rotor. This motor has two windings, a power winding and a two section control winding 47, having end terminals 41 and 42 and a common or winding center tap terminal 45. Again, for clarity, the power winding of this motor is not shown, but the direction of the flux fields set up in the pole pieces 109, 111, 113, 115, 117, 119, 121, and 123, on which this winding is wound, are shown with arrows. The solid arrow indicates the direction of the flux field during one half cycle of the alternating current applied thereto and the dotted arrows indicate the direction of the flux fields during the next half cycle of that alternating current. Section 43 of the control winding 38 is wound on pole pieces 110, 114, 118, and 122 and section 44 of the control winding is wound on the pole pieces 108, 112, 116, and 114. Sections 43 and 44 of the control winding 47 are wound on the pole piece of this motor in the same way they were wound on the pole pieces of the motor shown in Figs. 8 and 9, that is, when direct current flows in opposite directions through the control winding sections 43 and 44 from the center tap terminal 45 it establishes a north pole at the rotor end of each pole piece. As in the motor shown in Fig. 9 this method of winding the motor eliminates the side chatter. This figure shows the extension of the principles illustrated by that motor extended an eight rotating pole motor.

Freedom from chatter in any of the motors just described depends on the equal conduction of the push-pull connected motor drive tubes at balance. If either motor drive tube should fail the unidirectional current in the winding sections 43 and 44 of the control winding 47 would be unequal and, in an extreme case, the current in one winding might be zero. Such a condition would cause unbalanced torques to be applied to the rotor and chatter would result. Thus, chatter will indicate the failure of a motor drive tube and warn the operator of the system of such a failure.

While this invention has been illustrated by the use of two, four and eight rotating-pole motors, it should be understood that it will apply equally well to any motor of this type having an even number of rotating poles. While several methods of winding this type of motor to eliminate chatter due to direct current flowing in the control winding have been shown, this may be taken merely as illustrative of windings which satisfy the conditions of equal torque and thrust set forth earlier in this specification.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. An electrical apparatus comprising a reversible electric motor having a squirrel cage rotor and a stator having an even number of salient pole pieces, greater than four, a first winding adapted to be energized with alternating current of a substantially fixed phase, said first winding being wound on one half of the number of said pole pieces, and a second winding having two sections with a common terminal, said second winding being adapted to be energized with alternating current of a phase which leads or lags the phase of the alternating current in said first winding by approximately ninety electrical degrees, said second winding also being constructed to be energized with a unidirectional current, each section of said second winding being wound on half the number of the remaining half of said pole pieces, said windings being so arranged on the stator that they cooperate with each other when energized with alternating currents to produce rotation of the rotor in a direction dependent upon the phase relationship between said alternating currents, said second winding being further arranged on the stator so that unidirectional current flowing from the common terminal in opposite directions through each section of said second winding sets up in the pole pieces associated with each of said winding sections magnetic flux fields which produce zero net rotational torque and zero side thrust on the rotor and which when cut by the rotor retards the rotation of said rotor.

2. The apparatus as specified in claim 1 wherein unidirectional current flowing from the common terminal in opposite directions through each section of said second winding sets up in the pole pieces associated with said second winding flux fields all having the same direction with respect to the rotor and which when cut by the rotor retards the rotation of said rotor.

3. The apparatus as specified in claim 1 wherein unidirectional current flowing from the common terminal in opposite directions through each section of said second winding sets up in the pole pieces flux fields having polarities symmetrically arranged with respect to the rotor on either side of any rotor diameter and which when cut by the rotor retards the rotation of said rotor.

4. Electrical apparatus comprising, a two phase motor having a line phase circuit, a control phase circuit, and an even number of salient poles, greater than four, each of said poles having a single winding thereon, means connecting half of the windings of said poles in said line phase circuit, means connecting the other half of the windings of said poles in said control phase circuit, a pair of normally conducting push-pull amplifier devices connected to a unidirectional current power source, means connecting half of the windings of said poles in said control phase circuit in the output of one of said devices, means connecting the other half of the windings of said poles in said control phase circuit in the output of the other of said devices, said devices effecting reversible operation of said motor when said devices have an alternating input signal of one phase or another, and effecting unidirectional current damping of said motor when there is a balanced input to said device.

5. An electrical apparatus comprising a reversible electric motor, having a rotor and a stator, said stator having salient pole pieces, greater than four, a first winding, and a center tapped second winding having two sections, said first and second winding being wound on said pole pieces, each pole piece having but one portion of a winding or winding section wound thereon, said windings being so arranged on said stator with respect to said rotor that when energized with suitable alternating currents which differ in phase from each other by approximately ninety electrical degrees, they will cause rotation of the rotor in a direction dependent upon the phase relationship between said alternating currents, said windings being further arranged on said stator with respect to each other that unidirectional current flowing in opposite directions through the two sections of said second winding provides a damping force on said rotor without imparting to said rotor a net rotational torque or side thrust.

6. An electrical apparatus comprising a two phase reversible induction motor, having a stator and a rotor, said stator having an even number of salient pole pieces, greater than four, and a first and a second winding each of which is wound on one half of the number of said pole pieces, said first winding being adapted to be energized with an alternating current of substantially constant phase, said second winding having two sections, each of said sections being wound on half of the remaining number of said pole pieces, said second winding being adapted to cooperate with said first winding to cause rotation of said rotor when energized with an alternating current of a phase which leads or lags the alternating current in said first winding by approximately ninety electrical degrees, the direction of said rotation being dependent on the phase relationship between said alternating currents, a push-pull amplifier adapted to supply said alternating current to said second winding in response to an input signal, and a unidirectional current power supply for said amplifier, means connecting said power supply to said amplifier through both sections of said second winding.

7. An electrical apparatus comprising a reversible electric motor having a rotor and a stator having an even number of salient pole pieces, greater than four, a first winding adapted to be energized with an alternating current of a substantially fixed phase, a second winding having two sections with a common terminal and being adapted to be energized with an alternating current of a phase which leads or lags the alternating current in said first winding by approximately ninety electrical degrees, said windings being wound on said stator pole pieces, each pole piece having but one portion of a winding or winding section wound thereon, said windings being arranged on said stator to cooperate with each other to produce rotation of said rotor in a direction dependent on the phase relationship between said alternating currents, a push-pull connected electronic amplifier having an input adapted to receive an input signal and having an output connected to said second winding, a unidirectional current power supply for energizing said amplifier, and circuit means connecting said power supply to the common terminal of said second winding, said amplifier being operative when so connected to produce in said second winding an alternating current of such a phase as to cause rotation of said rotor in a direction dependent upon the characteristics of said input signal.

8. An electrical apparatus comprising a two phase rotating field motor having a squirrel cage rotor and a stator having an even number of salient wire wound pole pieces, greater than four, each having only one winding wound thereon, a single phase power supply connection for supplying a fixed alternating current energization for one half of said pole piece windings, a push-pull connected vacuum tube amplifier having an input adapted to receive an input signal and an output connected to the windings on the other half of the number of pole pieces, a direct current power supply for said amplifier, and means connecting said power supply to said amplifier including the motor winding connected to said amplifier, said amplifier being operative when so connected to produce in said connecting windings an alternating current of a phase dependent upon the characteristics of said input signal, said amplifier being operative in the absence of said input signal to permit appreciable amounts of direct current to flow through the connected pole piece windings, said pole piece windings being so connected that the direct current flowing therein sets up in the said pole pieces flux fields which produce a net rotational torque of zero and no net lateral thrust on said rotor.

9. An electrical apparatus comprising a reversible electric motor having a rotor and a stator, the latter having an even number of salient pole pieces, greater than four, a first winding adapted to be energized with an alternating current of a substantially fixed phase, a second winding having two sections having a common terminal, said second winding being adapted to be energized with an alternating current of a phase which leads or lags the alternating current in said first winding by approximately ninety electrical degrees, said windings wound on said pole pieces with each of said pole pieces having but one portion of a winding or winding section wound thereon, said windings being so arranged to cooperate with each other when energized to produce rotation of said rotor in a direction dependent on the phase relationship between said alternating currents, a push-pull amplifier having an input adapted to receive an input signal and an output connected to said second winding, said amplifier being operative to produce in said second winding an alternating current of such a phase as to cause rotation of the rotor in a direction dependent upon the characteristics of said input signal, a source of direct current for energizing said amplifier, and means including said second winding center tap and both sections of said second winding for connecting said amplifier to said source of direct current, said second winding being further arranged so that the direct current in each section thereof will establish in the pole pieces upon which they are wound fluxes having the same number and type of poles at the rotor end of said pole pieces on each side of any motor diameter.

10. An electrical apparatus comprising a reversible electric motor having a rotor and a stator, said stator having salient pole pieces, greater in number than four, a first winding adapted to be energized with alternating current of a substantially fixed phase, a second winding having two equal sections joined at a common terminal and adapted to be energized with an alternating current of a phase which leads or lags the alternating current in said first winding by ninety electrical degrees, said windings and winding sections being singularly wound on said pole pieces and so arranged to cooperate with each other when energized to produce rotation of said rotor in a direction dependent on the phase relationship between said alternating currents, an amplifier having a pair of push-pull connected vacuum tubes in its output, said vacuum tubes having their inputs adapted to receive an input signal and their outputs connected to said second windings, a source of unidirectional current for energizing said amplifier, and means including both sections of said second winding for connecting said amplifier to said source of unidirectional current, said amplifier being operative when so connected to produce in said second winding an alternating current of such a phase as to cause rotation of the motor in a direction dependent on the characteristics of said input signal, said windings being further arranged on said stator that the unidirectional current flowing in said second winding does not set up flux fields which interact with other flux fields in the motor, in the absence of an input signal to said push-pull connected vacuum tubes, to cause motion of said rotor unless said vacuum tubes are conducting equally.

11. An electrical apparatus comprising a measuring circuit, means responsive to a condition for unbalancing the circuit, means for rebalancing the circuit, a reversible electric motor for operating the circuit rebalancing means, said motor having a rotor and a salient pole piece stator having with an even number of pole pieces, greater than four, and having three windings, said three windings being wound on said pole pieces, each of said pole pieces having but one or a portion of one of said three windings wound thereon, one of said windings being a power winding the other two of said windings being joined together to form a control winding, an electronic amplifier controlled by said measuring circuit for controlling the rebalancing operations of said motor, said amplifier including an amplifying section, a phase inverting section, a push-pull motor drive section and a unidirectional current power supply therefor, said motor control winding being directly connected to the push-pull motor drive section of the amplifier, and means connecting the power supply to the junction of the two windings which form the control winding to energize said motor drive section and to supply unidirectional current to both of the windings which form the control winding to provide damping for said motor.

12. An electrical apparatus comprising a measuring circuit, means responsive to a condition for unbalancing the circuit, means for rebalancing the circuit, a reversible electric motor for operating the circuit rebalancing means, said motor having a rotor and a stator, said stator having salient pole pieces, greater than four, a first winding adapted to be energized with alternating current of a substantially fixed phase, a second winding having two sections and adapted to be energized with an alternating current of a phase which leads or lags the alternating current in said first winding by 90 electrical degrees, said windings being wound on said pole pieces, each pole piece having but one portion of a winding or winding section wound thereon, said windings being arranged on said stator so as to cooperate with each other when energized to produce rotation of said rotor in a direction dependent upon the phase relationship between said alternating currents, and an electronic amplifier controlled by said measuring circuit, said amplifier including an amplifier section, a phase inverting section, a push-pull motor drive section and a unidirectional current power supply therefor, said phase inverting section of said amplifier including a triode tube having equal resistances in its plate and cathode circuits and its grid directly coupled to the last stage of the amplifying section of said electronic amplifier, said motor control winding being directly connected to the push-pull motor drive section of the amplifier, means connecting the power supply to both sections of said motor control winding to energize said motor drive section and to supply unidirectional current to both sections of said winding to provide damping for said motor.

13. An electrical apparatus comprising an alternating current signal amplifier having a direct current energized push-pull output section and a direct current power supply, a reversible two stage induction motor, said motor having a rotor and a salient pole piece stator having three windings, said three windings being wound on said pole pieces, each of said pole pieces having only one or a portion of a winding wound thereon, one of said windings being a power winding, the other two of said windings being joined together to form a control winding, said motor control winding being directly connected to the push-pull motor drive section of said amplifier, and means connecting said direct current power supply to the junction of the two windings which form the control winding thereby energizing said motor drive section with unidirectional current through said control winding, wherein said last connection is so arranged that when, in the absence of an alternating current signal from said amplifier, said unidirectional current supplied to the push-pull output stage through said motor control windings is balanced said motor will be free of chatter and when the unidirectional current supplied to the push-pull output through said motor control winding is unbalanced said motor will chatter.

References Cited in the file of this patent
UNITED STATES PATENTS

| | | |
|---|---|---|
| 2,192,022 | Wills | Feb. 27, 1940 |
| 2,209,369 | Wills | July 30, 1940 |
| 2,404,894 | Wills | July 30, 1940 |
| 2,497,053 | Wills | Feb. 7, 1950 |
| 2,527,665 | Wild | Oct. 31, 1950 |
| 2,610,312 | Seay | Sept. 9, 1952 |